United States Patent [19]
Varis et al.

[11] Patent Number: 5,894,654
[45] Date of Patent: Apr. 20, 1999

[54] METHOD OF FORMING A ROTOR STRUCTURE FOR ELECTRICAL MACHINE

[75] Inventors: Seppo Varis, Espoo; Ari Meri, Karkkila, both of Finland

[73] Assignee: ABB Industry Oy, Helsinki, Finland

[21] Appl. No.: 08/780,412

[22] Filed: Jan. 9, 1997

Related U.S. Application Data

[62] Division of application No. 08/387,803, filed as application No. PCT/FI93/00284, Nov. 24, 1994.

[30] Foreign Application Priority Data

Aug. 21, 1992 [FI] Finland .................................. 923788

[51] Int. Cl.⁶ .................................................. H02K 15/02
[52] U.S. Cl. ........................... 29/598; 29/447; 310/42; 310/217
[58] Field of Search ........................... 29/596, 598, 609, 29/447; 310/42, 216, 217, 156, 261

[56] References Cited

U.S. PATENT DOCUMENTS

| | | |
|---|---|---|
| 1,158,463 | 11/1915 | Eaton ................................ 29/598 |
| 2,169,617 | 8/1939 | Schmidt . |
| 3,417,272 | 12/1968 | Hoy . |
| 3,597,835 | 8/1971 | Uccle et al. ...................... 29/598 |
| 3,694,906 | 10/1972 | Rank et al. . |
| 3,842,300 | 10/1974 | Daykin et al. . |

*Primary Examiner*—Carl E. Hall
*Attorney, Agent, or Firm*—Watson Cole Grindle Watson, P.L.L.C.

[57] ABSTRACT

A method of producing a rotor structure for an electrical machine includes heating a plurality of annular plates and then placing the heated plates around an axle such that the plates shrink and attach to the axle, the plates buckling into the general shape of a truncated cone as they cool. The heated plates can be positioned on the axle individually or as a group, thus forming a rotor core packet of stampings around the axle.

8 Claims, 1 Drawing Sheet

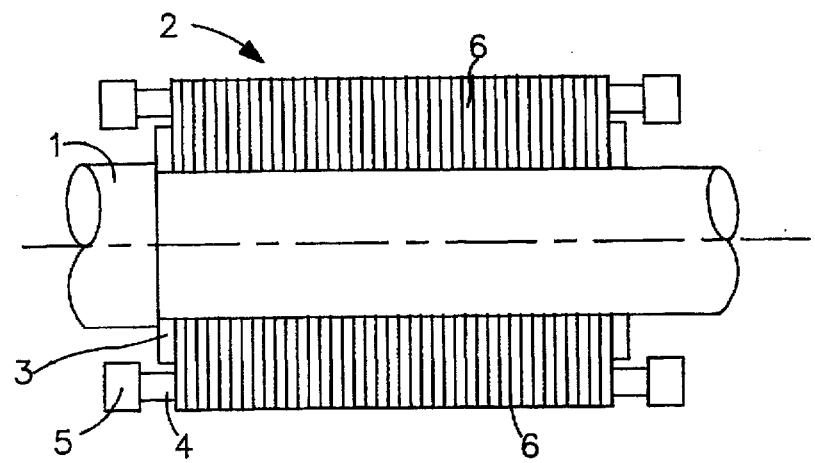
FIG. 1
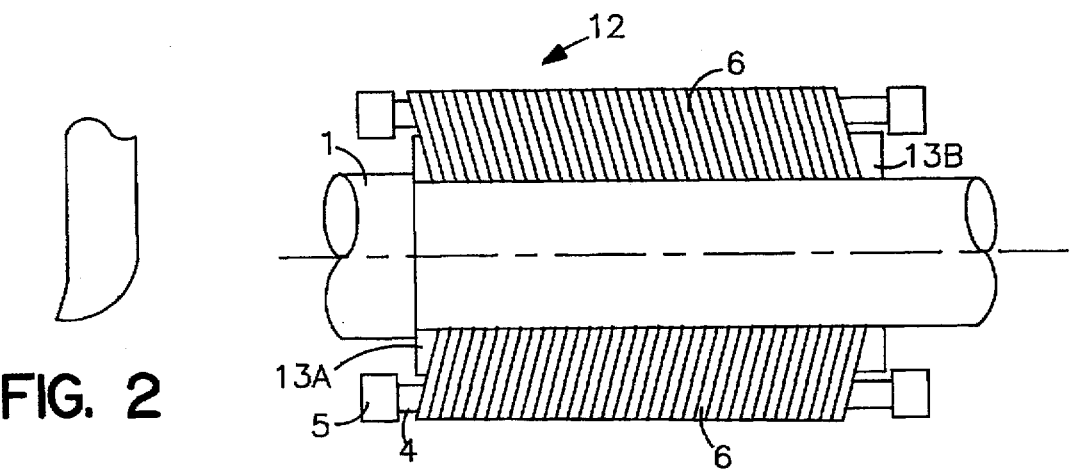
FIG. 2
FIG. 3
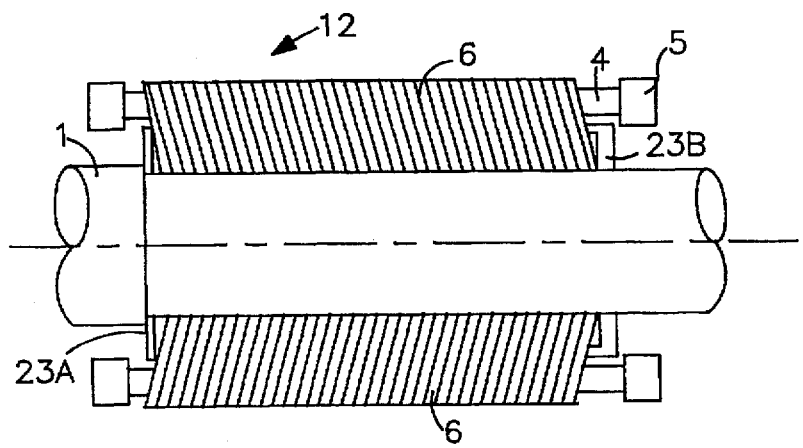
FIG. 4

METHOD OF FORMING A ROTOR STRUCTURE FOR ELECTRICAL MACHINE

This application is a division of application Ser. No. 08/387,863, filed Feb. 28, 1995, now abandoned, which is a national stage of PCT/FI95/00284, filed on Nov. 24, 1994.

BACKGROUND OF THE INVENTION

1. Field of the Invention

The present invention relates to a rotor structure for an electrical machine which includes an axle and a rotor core packet of stampings form of annular plates arranged on the axle.

2. The Prior Art

A conventional rotor structure for an electrical machine is depicted in FIG. 1. It includes, an axle 1, a rotor core packet of stampings 2 with essentially annular plates 6 arranged on the axle, pressure rings 3 mounted to clamp the ends of the rotor core packet of stampings, and in the case of a squirrel-cage machine rotor rods 4 and short-circuiting rings 5 connected thereto. The rotor rods are mounted in grooves die cut on the circumference of the plates in the rotor core packet of stampings. Practical experience has shown that, although the rotor core packet of stampings of the engine and its winding is made as homogeneous and symmetrical as possible, especially in the case of high-speed bipolar machines, the change of the balance status due to temperature differences causes vibration problems in a finished machine.

SUMMARY OF THE INVENTION

The object of the present invention is to provide a rotor structure which in use has minor vibration problems compared to a conventional rotor structure. This is achieved by means of the rotor structure according to the invention which is characterized in that the plates of the rotor core packet of stampings are generally of the shape of a truncated cone.

The coning angle of the plates in the rotor core packet of stampings is advantageously between about 2° and 5°, preferably about 3°.

If the rotor structure includes pressure rings mounted to support the ends of the rotor core packet of stampings in the axial direction, the end faces of the pressure rings facing towards the rotor core packet of stampings preferably have a shape corresponding to the truncated cone shape of the rotor core packet of stampings. In practice the truncated cone shape of the end faces of the pressure rings can be achieved either so that their end faces are completely like a truncated cone and their coning angle corresponds to the coning angle of the plates of the rotor core packet of stampings, or alternatively the end faces of the pressure rings facing towards the rotor core packet of stampings including one or more essentially annular areas, at which the pressure rings are in contact with the end plates of the rotor core packet of stampings.

BRIEF DESCRIPTION OF THE DRAWINGS

In the following the invention will be described in greater detail with reference to the attached drawing, where FIG. 1 illustrates the rotor structure of a conventional electric machine, FIG. 2 illustrates the die-cut edge of a plate in the rotor core packet of stampings of the rotor structure, which edge is adjacent to the rotor axle, FIG. 3 illustrates an example of an embodiment of the rotor structure according to the invention, and FIG. 4 illustrates another example of an embodiment of the rotor structure according to the invention.

DETAILED DESCRIPTION OF THE PREFERRED EMBODIMENTS

The rotor structure according to the invention is based on the idea that the vibration problems of conventional rotor structures of the type shown in FIG. 1 are not so much caused by a non-homogeneous or asymmetrical rotor structure but by the fact that the main reason for a change in the equilibrium is the impact of the rotor core packet of stampings on the surface of the axle which rotor core packet of stampings has been applied to the axle by means of a shrinking force. When holes for the axle 1 are die cut in the plates of the rotor core packet of stampings, the die cut edges have a bevel-like profile in accordance with FIG. 2. This profile is thus asymmetrical and includes a burr on the back surface of the plates seen from the die cutting direction. Because of this bevellike profile, the shrinking force by means of which the plates of the rotor core packet of stampings are connected to the axle 1 is asymmetrically directed to the axle, whereby the plate tends to incline towards the broader side and settle in a generally almost conical shape reminding of a saucer. In the conventional rotor structure according to FIG. 1 the plates 6 are, however, forced perpendicularly with respect to the axle 1. As a result of this, the surface pressure of the plates is indifferent, which may considerably change the equilibrium due to small changes in the stress state of the other parts of the rotor, which changes are caused, for example, as a result of the impact of temperature differences. The significance of the phenomenon in question is described by that in some tests the vibration has been found to suddenly grow from a value close to the acceptable to almost three times higher when the motor is warmed up.

The basic idea of the rotor structure according to the invention is that the plates are allowed to settle or they are forced into a stable position with respect to the stress state, i.e. generally the shape of a cone or more exactly the shape of a truncated cone. Solutions like this are shown in FIGS. 3 and 4 of the enclosed drawing.

In the structure according to FIG. 3 the plates 6 of the rotor core packet of stampings 12 are forced by means of pressure rings 13A and 13B generally into the shape of a truncated cone. In order to achieve this, the pressure rings 13A and 13B are on their end faces facing towards the rotor core packet of stampings 12 machined into a shape corresponding to the disired coning angle. The coning angle may in practice vary between 2° and 5°, being most advantageously about 30. A rotor core packet of stampings of this type used in the rotor structure according to FIG. 3 is thus at first pressed in a separate pressing machine between its pressure rings 13A and 13B so that its plates get essentially the shape of a truncated cone after which the rotor core packet of stampings is heated to a suitable temperature in order for it to expand by heat, whereafter the hot rotor core packet of stampings is brought to the axle 1 to its final position so that, for example, one of its pressure rings 13A is supported against a shoulder on the axle and the rotor core packet of stampings is allowed to cool in this position. When the rotor core packet of stampings cools it tends to shrink, and because of the shrinking force, it becomes very firmly and reliably attached to the axle 1. Thus, in practice, the inner hole of the plates 6 of the rotor core packet of stampings is die cut a little smaller than the diameter of the axle 1 at the point where the rotor core packet of stampings is mounted.

Roughly speaking, the plates of the rotor core packet of stampings may be arranged in three different ways. According to the first method the plates are arranged without preheating directly on the axle. In this case the fit is so loose that the rotation of the rotor packet with respect to the axle is ensured by a wedge. According to the second method the plates are heated to a temperature of about 100° C. and arranged one by one, in packs or as a whole packet on the axle. Also in this case a locking wedge is usually used. According to the third method the rotor core packet of stampings is heated to a temperature exceeding 200° C. and placed on the axle. In this case a locking wedge is not needed. The conical structure according to the invention may be used and is preferred in all the above described cases, but it is most useful in the third case.

FIG. 4 shows another example of an embodiment of the rotor structure according to the invention, which embodiment to all other parts corresponds to the embodiment of FIG. 3 except that the end faces of the pressure rings 23A and 23B facing towards the rotor core packet of stampings 12 are not machined into conical shape. The desired conical shape may, however, be given to the rotor core packet of stampings 12 also by means of the pressure rings 23A and 23B because their end faces facing towards the rotor core packet of stampings include annular areas which contact the end plates of the rotor core packet of stampings. In this way the pressure ring 23A is supported on the rotor core packet of stampings 12 only at the edge area of its end face, whereas the pressure ring 23B is supported on the rotor core packet of stampings both at the edge next to the axle 1 and its outer edge which is provided with a protrusion corresponding to the desired coning angle. Thus the envelope of the end face of the pressure ring 23B facing towards the rotor core packet of stampings is the shape of a truncated cone and its coning angle corresponds to the wished coning angle of the rotor core packet of stampings 12.

When especially the solutions according to FIGS. 3 and 4 are being used, in which the plates 6 of the rotor core packet of stampings 12 are forced into the shape of a truncated cone, the plates can be forced into this shape either in the direction in which they naturally would settle due to the bevel-like profile shown in FIG. 2 or in a direction opposite to this. The latter alternative cannot, however, be used when the plates of the rotor core packet of stampings are allowed to naturally settle in the shape of a truncated cone and the rotor core packet of stampings is bound together without pressure rings, for example, by means of resin.

In the method according to the invention stabilization of the stresses in the rotor structure is achieved by arranging the rotor core packet of stampings conical. Also other known solutions are known for stabilizing the stresses in the rotor core packet of stampings. One of these solutions is the machining of the internal hole of the plates, whereby the surface pressure is symmetrical and does not cause any pressure in the plates to become conical. Also in this case a conical structure further improves stability even if the machining in this case is unnecessary. Another possibility for symmetrization is to arrange the plates one at a time or in regular groups so that their burrs are located on opposite surfaces. This method increases the additional losses occurring in the rotor. Both methods are, in addition, less advantageous with respect to their production costs than the structure according to the invention.

Although embodiments of the rotor structure for an electric machine according to the invention have been described, it is to be understood that some structural changes can be made in the embodiments without deviating from the scope of the enclosed claims.

We claim:

1. A method for producing a rotor structure for an electrical machine, which rotor core structure includes an axle and a rotor core packet of stampings therearound, said method comprising providing an axle and a plurality of annular plates spaced from said axle, heating the annular plates to a temperature exceeding 100° C., repositioning the axle and the plurality of heated annular plates such that the heated annular plates are positioned around said axle, and cooling the annular plates so that they buckle into a generally frustoconical shape having a coning angle between about 2° C. and 5° C.

2. A method for producing a rotor structure according to claim 1, wherein pressure rings are included to support the ends of the rotor core packet of stampings in an axial direction of the axle, end faces of said pressure rings facing the rotor core packet of stampings having a shape corresponding to the shape of a truncated cone of the rotor core packet of stampings.

3. A method of producing a rotor structure according to claim 2, wherein said end faces of the pressure rings are of the shape of a truncated cone and the coning angle of the end faces corresponds to the coning angle of the plates of the rotor core packet of stampings.

4. A method of producing a rotor structure according to claim 2, wherein the end faces of the pressure rings facing the rotor core packet of stampings comprise one or more essentially annular areas which are in contact with end plates of the rotor core packet of stampings.

5. A method of producing a structure according to claim 1, wherein said coning angle is about 3°.

6. A method of producing a rotor structure according to claim 1, wherein the plurality of heated annular plates are individually positioned around said axle.

7. A method of producing a rotor structure according to claim 1, wherein the plurality of heated annular plates are positioned as a group around said axle.

8. A method for producing a rotor structure for an electrical machine, which rotor structure includes an axle and a rotor core packet of stampings therearound, said method comprising providing an axle and a plurality of annular plates, pressing said plurality of annular plates between pressure rings in a pressing machine to provide a rotor core packet of stampings whose plates are shaped as truncated cones, heating said rotor core packet of stampings to at least 100° C., positioning said heated rotor core packet of stampings around said axle, and cooling said rotor core packet of stampings so as to shrink and attach to said axle.

* * * * *